United States Patent
Rivard-Mulrooney et al.

(10) Patent No.: US 12,147,402 B1
(45) Date of Patent: Nov. 19, 2024

(54) METHOD FOR INDEX STRUCTURE OPTIMIZATION USING INDEX DEDUPLICATION

(71) Applicant: Coveo Solutions Inc., Québec (CA)

(72) Inventors: Yannis Rivard-Mulrooney, Québec (CA); Daniel Lavoie, Québec (CA); Pierre Rousseau, Québec (CA)

(73) Assignee: Coveo Solutions Inc., Québec (CA)

( * ) Notice: Subject to any disclaimer, the term of this patent is extended or adjusted under 35 U.S.C. 154(b) by 0 days.

(21) Appl. No.: 18/350,013

(22) Filed: Jul. 11, 2023

(51) Int. Cl.
*G06F 16/215* (2019.01)
*G06F 16/248* (2019.01)

(52) U.S. Cl.
CPC .......... *G06F 16/215* (2019.01); *G06F 16/248* (2019.01)

(58) Field of Classification Search
None
See application file for complete search history.

(56) References Cited

U.S. PATENT DOCUMENTS

| | | | | |
|---|---|---|---|---|
| 9,747,287 | B1* | 8/2017 | Bhardwaj | G06F 3/0631 |
| 10,452,297 | B1 | 10/2019 | Karr et al. | |
| 2009/0083563 | A1* | 3/2009 | Murase | G06F 3/0608 |
| | | | | 713/324 |
| 2011/0138144 | A1* | 6/2011 | Tamura | G06F 3/0641 |
| | | | | 711/E12.002 |
| 2014/0310476 | A1 | 10/2014 | Kruus et al. | |
| 2015/0026140 | A1* | 1/2015 | Amit | G06F 16/1748 |
| | | | | 707/692 |
| 2016/0259590 | A1* | 9/2016 | Yoshida | G06F 3/0641 |
| 2017/0177266 | A1 | 6/2017 | Doerner et al. | |
| 2017/0315875 | A1 | 11/2017 | Tirupati Nagaraj et al. | |
| 2018/0364917 | A1* | 12/2018 | Ki | G06F 3/0608 |
| 2020/0019330 | A1* | 1/2020 | Brandt | G06F 12/0802 |
| 2020/0057752 | A1 | 2/2020 | Tofano | |
| 2021/0034584 | A1* | 2/2021 | Dalmatov | G06F 16/24568 |
| 2021/0073178 | A1 | 3/2021 | Yin et al. | |
| 2021/0109900 | A1 | 4/2021 | McIlroy et al. | |
| 2021/0132837 | A1 | 5/2021 | Goswami et al. | |

(Continued)

OTHER PUBLICATIONS

Xu et al., "Online Deduplication for Databases", SIGMOD '17: Proceedings of the 2017 ACM International Conference on Management of Data, pp. 1355-1368, May 31, 2017. https://doi.org/10.1145/3035918.3035938.

(Continued)

*Primary Examiner* — Christopher J Raab
(74) *Attorney, Agent, or Firm* — KDW Firm PLLC (57) ABSTRACT

A method for index deduplication includes parsing entries to be deduplicated and identifying groups of entries therein, each group including entries having a same first data field value. The method includes, for each group, identifying a common second data field value and creating a deduplicated entry storing the first data field value of the group of entries and the common second data field value. The method also includes, for each unique ID field value of the entries to be deduplicated, generating a correspondence vector having a plurality of vector fields each associated with one of the group of entries, and storing, in each vector field, a value indicative of an existence, in the entries to be deduplicated, of a duplicated entry containing the unique ID field value, the first data field value of the group, and the common second data field of the group.

20 Claims, 7 Drawing Sheets

(56) References Cited

U.S. PATENT DOCUMENTS

2021/0157771 A1    5/2021   Simha et al.
2022/0107925 A1    4/2022   Goswami

OTHER PUBLICATIONS

Yue et al., "Analysis of Indexing Structures for Immutable Data", SIGMOD '20: Proceedings of the 2020 ACM SIGMOD International Conference on Management of Data, pp. 1-17, Mar. 10, 2020.

* cited by examiner

METHOD FOR INDEX STRUCTURE OPTIMIZATION USING INDEX DEDUPLICATION

TECHNICAL FIELD

The present disclosure generally relates to data structures in business-to-business environments. More specifically, the disclosure relates to a method for optimizing a large-scale data structure using index deduplication and a method of querying the optimized data structure.

BACKGROUND

In a business-to-business (B2B) environment, a provider company generally offers products and/or services to a plurality of reselling or distributing client companies. Some parameters associated with the products or services offered may vary from one client company to another. For example, the selling price of a product, or a minimal number of units, offered may vary based on deals negotiated between the provider company and each reselling/distributing company.

Provider companies evolving in a B2B environment usually maintain databases for their products and clients. Data stored in such databases can expand greatly over time, for example when the number of products offered and/or the number of client companies increases. Furthermore, data may be duplicated when storing data entries in the databases to account for varying parameters of the offered products. For example, product A may be associated to X data records, or entries, in a database to account for X different price points at which product A may be offered to different client companies. Thus, a provider company having a portfolio of a million products, and 10,000 reselling/distributing client companies, can end up with a database or an index of 10 billion entries, since each client company may have their own negotiated prices for a given product.

Maintaining and querying B2B databases can become unmanageable as the dataset increases. To limit query time and processing, provider companies will generally maintain a database with generic information for every product, e.g., the Manufacturer Suggested Retail Price (MSRP) price of the products offered. When the buyer of a reselling company browses products from a given provider, he will be presented the MSRP price, rather than the negotiated price, to keep the response time from the provider's website reasonable. However, this prevents the reselling/distributing companies from receiving customized results when browsing products on the providers' website.

In other words, when a client from a reselling/distribution company browses a website to shop for products, he will usually be presented generic product information, such as the MSRP price or a generic bundle quantity, when performing searches, because fetching a tailored information from an index of 10 billion entries at query would necessitate too much computing power and/or computing time. Therefore, sales may be missed, because the client is not presented with tailored information while browsing, but only at check-out.

Therefore, there is a need for a method adapted to optimize index data structures and data querying of large datasets to allow providing customized and accurate information on products/items being searched.

SUMMARY

Some aspects of the present disclosure include:

In a first example, a method for deduplication of document entries in a database comprises the steps of: retrieving, from the database, entries to be deduplicated, each entry comprising an identification (ID) field, a first data field and a second data field; parsing the entries and identifying groups of entries therein, each group comprising one or more entries having a same first data field value; generating a virtual ID value for identifying new entries; for each group of entries: identifying a common second data field value; and creating a deduplicated entry in a deduplicated database with the virtual ID value in the ID field, the first data field value of the group of entries in the first data field and the common second data field value in the second data field, respectively; for each unique ID field value of the entries to be deduplicated: generating a correspondence vector having a plurality of vector fields, each vector field associated with one of the group of entries; and storing, in each vector field, a value indicative of an existence, in the entries to be deduplicated, of a duplicated entry containing the unique ID field value, the first data field value of the group of entries associated with the vector field, and the common second data field of the group of entries; and adding, to the deduplicated database, remaining entries comprising the entries to be deduplicated excluding duplicated entries, the deduplicated database comprising the deduplicated entries and the remaining entries and having a reduced size relative to a size of the entries to be deduplicated, thereby reducing computing needs for storing the deduplicated database.

In a second example, the method of the first example further comprises the steps of querying the deduplicated database including: receiving query information from an application interface, the query information including a specific client ID field value and at least one of a first data field query value and a second data field query value; retrieving, from the deduplicated database, first and second sets of results using the query information, the first set of results being retrieved from the deduplicated entries and the second set of results being retrieved from the remaining entries; combining the first and second sets of results to generate a combined query set indicative of an existence of one or more result entries containing the specific client ID field value and the at least one of the first data field query value and the second data field query value; retrieving, in the deduplicated database, the one or more result entries based on the combined query set, and transmitting, to the application interface, the one or more result entries corresponding to the query information.

In a third example, in the method of the second example, when the query information includes the specific client ID field value and the first data field query value, the step of retrieving the first set of results includes: generating a virtual ID vector having a plurality of virtual ID vector fields, each virtual ID vector field associated with one of the groups of entries; storing, in each vector field of the virtual ID vector, a value indicative an existence of an entry containing the virtual ID value and the first data field value of the group of entries associated with the virtual ID vector field wherein the first data field value matches the first data field query value; and comparing, using a field-by-field comparison, the virtual ID vector with the correspondence vector associated with the specific client ID field value of the query to generate the first set of results.

In a fourth example, in the method of the second example, when the query information includes the specific client ID field value and the second data field query value, the step of retrieving the first set of results includes: generating a virtual ID vector having a plurality of virtual ID vector fields, each virtual ID vector field associated with one of the groups of entries; storing, in each vector field of the virtual ID vector, a value indicative an existence of an entry containing the virtual ID value, the first data field value of the group of entries associated with the virtual ID vector field, and a second data field value matching the second data field query value; and comparing, using a field-by-field comparison, the virtual ID vector with the correspondence vector associated with the specific client ID field value of the query to generate the first set of results.

In a fifth example, in the method of the fourth example, the step of retrieving the second set of results includes: generating a client ID vector having a plurality of client ID vector fields, each client ID vector field associated with one of the groups of entries; and storing, in each client ID vector field, a value indicative of an existence of an entry storing the specific client ID field value, the first data field value of the group of entries associated with the client ID vector field, and the second data field query value, the second set of results comprising the client ID vector.

In a sixth example, in the method of the fifth example, combining the first and second sets of results comprises performing a field-by-field combination of the first and second sets of results.

In a seventh example, the method of the sixth example further comprising comprises a step of converting the result entries into human-readable results.

In an eighth example, in the method of the second example, the at least one of a first data field query value and a second data field query value comprises a range of values.

In a ninth example, in the method of the first example, the deduplicated database is stored in a B-tree and the entries are arranged in an order of second data field values.

In a tenth example, in the method of the second example, the virtual ID value is a primary virtual ID value, the common second data field value is a primary common second data field value, and each correspondence vector is a primary correspondence vector; and wherein the method comprises steps of: determining a secondary virtual ID value for identifying additional new entries; for each group of entries: identifying a secondary common second data field value; and creating a deduplicated entry with the second virtual ID value in the ID field, the first data field value in the first data field and the secondary common second data field value in the second data field, respectively; for each unique ID field value of the entries to be deduplicated: generating a secondary correspondence vector having a plurality of vector fields, each vector field associated with one of the group of entries; and storing, in each vector field, a value indicative of an existence, in the entries to be deduplicated, of an additional duplicated entry containing the unique ID field value, the first data field value of the group of entries associated with the vector field, and the secondary common second data field of the group of entries, wherein the remaining entries comprise the entries to be deduplicated excluding the duplicated entries and additional duplicated entries.

In an eleventh example, in the method of of the fifth example, the steps being repeated for a plurality of additional common second data field values.

In a twelfth example, in the method of the tenth example, when the query information includes the specific client ID field value and the second data field query value, the step of retrieving the first set of results includes: generating primary and secondary virtual ID vectors, each virtual ID vector having a plurality of virtual ID vector fields, each virtual ID vector field associated with one of the groups of entries; storing, in each virtual ID vector field of the primary virtual ID vector, a value indicative an existence of an entry containing the primary virtual ID value, the first data field value of the group of entries associated with the virtual ID vector field, and a second data field value matching the second data field query value; storing, in each virtual ID vector field of the secondary virtual ID vector, a value indicative an existence of an entry containing the secondary virtual ID value, the first data field value of the group of entries associated with the virtual ID vector field, and the second data field value matching the second data field query value; comparing, using a field-by-field comparison, the primary virtual ID vector with the primary correspondence vector associated with the specific client ID field value of the query to generate a primary first result vector; comparing, using the field-by-field comparison, the secondary virtual ID vector with the secondary correspondence vector associated with the specific client ID to generate a secondary first result vector; and combining, using a field-by-field combination, the primary and secondary first result vectors to generate the first set of results.

In a thirteenth example, a system for data deduplication comprises: a communication module adapted to communicate with a provider database to retrieve entries to be deduplicated, each entry comprising an identification (ID) field, a first data field and a second data field, the provider database being external to the system; a deduplication module adapted to deduplicate the entries retrieved by the communication module by: parsing the entries to be deduplicated and identifying therein groups of entries, each group comprising one or more entries having a same first data field value; generating a virtual ID value for identifying new entries; for each group of entries: identifying a common second data field value; and creating a deduplicated entry with the virtual ID value in the ID field, the first data field value of the group of entries in the first data field and the common second data field value in the second data field, respectively; for each unique ID field value of the entries to be deduplicated: generating a correspondence vector having a plurality of vector fields, each vector field associated with one of the group of entries; and storing, in each vector field, a value indicative of an existence, in the entries to be deduplicated, of a duplicated entry containing the unique ID field value, the first data field value of the group of entries associated with the vector field, and the common second data field of the group of entries; a deduplicated database configured for storing deduplicated entries received from the deduplication module and remaining entries, the remaining entries comprising the entries to be deduplicated excluding duplicated entries; and at least one processing device and one non-transitory memory having processor-readable instructions stored thereon that, when read by the processing device, are configured to control the communication module and the deduplication module.

In a thirteenth example, the system of the thirteenth example further comprises: a client interface module adapted to receive query information from a client device and to transmit query results to the client device; and a query module adapted to retrieve query results in the deduplicated database based on the query information, wherein the instructions are further configured to control the client interface module and the query module.

In a fifteenth example, a computer-readable medium storing computer-readable instructions thereon that when, read by a computer, perform the steps of: retrieving, from the database, entries to be deduplicated, each entry comprising an identification (ID) field, a first data field and a second data field; parsing the entries and identifying groups of entries therein, each group comprising one or more entries having a same first data field value; generating a virtual ID value for identifying new entries; for each group of entries: identifying a common second data field value; and creating a deduplicated entry in a deduplicated database with the virtual ID value in the ID field, the first data field value of the group of entries in the first data field and the common second data field value in the second data field, respectively; for each unique ID field value of the entries to be deduplicated: generating a correspondence vector having a plurality of vector fields, each vector field associated with one of the group of entries; and storing, in each vector field, a value indicative of an existence, in the entries to be deduplicated, of a duplicated entry containing the unique ID field value, the first data field value of the group of entries associated with the vector field, and the common second data field of the group of entries; and adding, to the deduplicated database, remaining entries comprising the entries to be deduplicated excluding duplicated entries, the deduplicated database comprising the deduplicated entries and the remaining entries and having a reduced size relative to a size of the entries to be deduplicated, thereby reducing computing needs for storing the deduplicated database.

DETAILED DESCRIPTION

As will be described in further detail below, the proposed method and system, according to an aspect, aim to optimize index data structure creation by using index deduplication to generate a deduplicated index with a reduced number of entries relative to a number of initial entries to be indexed. Further, the proposed method and system, according to another aspect, aim to leverage querying through the generated deduplicated index. Therefore, the methods and system described advantageously allow for improving the performance of a computing system generating, maintaining, or querying the deduplicated index by reducing the computing power needed for indexing the data, and computer storage needed for storing the deduplicated index, and by reducing the computing power needed to query the index.

The method and system described herein advantageously leverage the notion that some data structures store highly duplicated data entries. For example, a B2B business, or provider, offering a given product to a number of clients with one or more parameters of the product varying depending on the client, may have the same product information duplicated across a plurality of entries. This results in part of the data storage being used to store duplicated data associated with the product. When indexing such a database, the duplicated entries are carried in the index.

The methods and system therefore generally allow for receiving data entries from an external or third-party database, e.g., product information and client information received as data entries from a B2B provider, and processing the data entries to generate a deduplicated index, or data structure, having a smaller footprint than the received data entries. The methods and system also include steps for efficiently querying the deduplicated data structure, allowing for extracting precise data from the entries initially provided by the B2B provider more efficiently than would be possible without the deduplicated data structure.

In the following description, "B2B provider" refers to a business providing products and/or services to another business, the "B2B client". For example, the B2B provider may be a wholesaler, while the B2B client may be a retailer. In the following description, the B2B provider maintains a database including entries to be indexed, or entries to be deduplicated as described below, while the B2B client is a client which may query through the index.

The term "data structure" is used to refer to a structure used to store and organize data, such as data trees, data heaps and data queues, for example. The term "data structure" may be used to refer to an index. Further, a data structure may also encompass at least part of a database.

In the present disclosure, it will be appreciated that, for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art, that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way but rather as merely describing the implementation of the various embodiments described herein.

One or more systems described herein may be implemented in computer programs executing on processing devices, each comprising at least one processor, a data storage system (including volatile and non-volatile memory and/or storage elements), and optionally at least one input device and at least one output device. The term "processing device" or "computing device" encompasses computers, servers and/or specialized electronic devices which receive, process and/or transmit data. "Processing devices" are generally part of "systems" and include processing means, such as microcontrollers and/or microprocessors, CPUs or are implemented on FPGAs, as examples only. For example, and without limitation, the processing device or computing device may be a programmable logic unit, a mainframe computer, server, and personal computer, cloud-based program or system, laptop, personal data assistance, cellular telephone, smartphone, wearable device, tablet device, video game console, or portable video game devices.

Each program and/or method described herein is preferably implemented in a high-level procedural or object-oriented programming and/or scripting language to communicate with a computer system. However, the programs can be implemented in assembly or machine language, if desired. In any case, the language may be a compiled or interpreted language. Each such computer program is preferably stored on a storage media or a device readable by a general or special purpose programmable computer for configuring and operating the computer when the storage media or device is read by the computer to perform the procedures described herein. In some embodiments, the system may be embedded within an operating system running on the programmable computer.

Furthermore, the system, processes and methods of the described embodiments are capable of being provided in a computer program product comprising a computer readable medium that bears computer-usable instructions for one or more processors. The computer-usable instructions can also be in various forms including compiled and non-compiled code. The processor(s) are used in combination with storage medium, also referred to as "memory" or "storage means". Storage medium can store instructions, algorithms, rules and/or trading data to be processed. Storage medium encompasses volatile or non-volatile/persistent memory, such as registers, cache, RAM, flash memory, ROM, diskettes, compact disks, tapes, chips, as examples only. The type of memory is of course chosen according to the desired use, whether it should retain instructions, or temporarily store, retain or update data. Steps of the proposed method are implemented as software instructions and algorithms, stored in computer memory and executed by processors.

Figure 1:
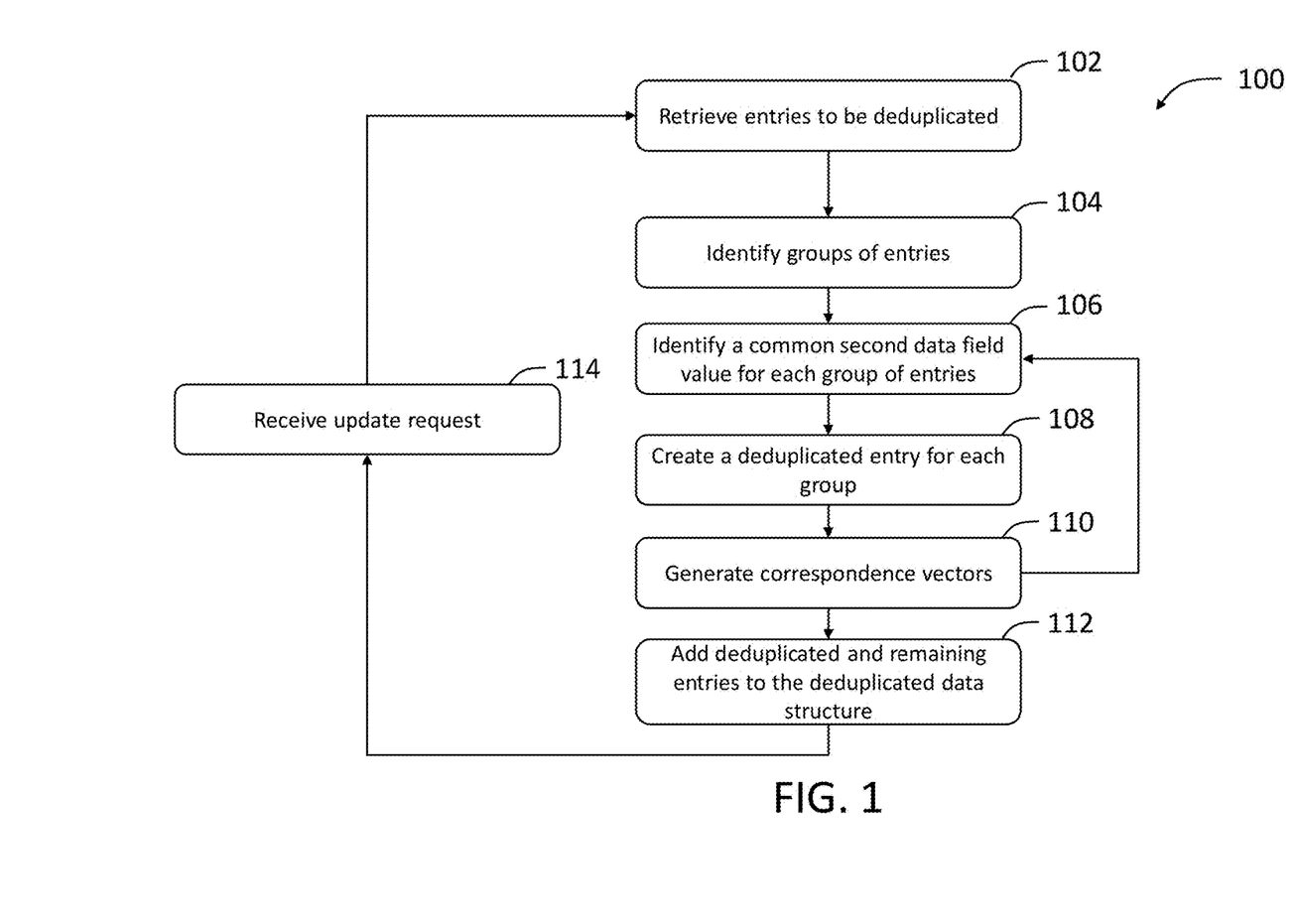
FIG. 1 is flowchart of a method for optimizing an index data structure using index deduplication, according to an embodiment.
Figure 2:
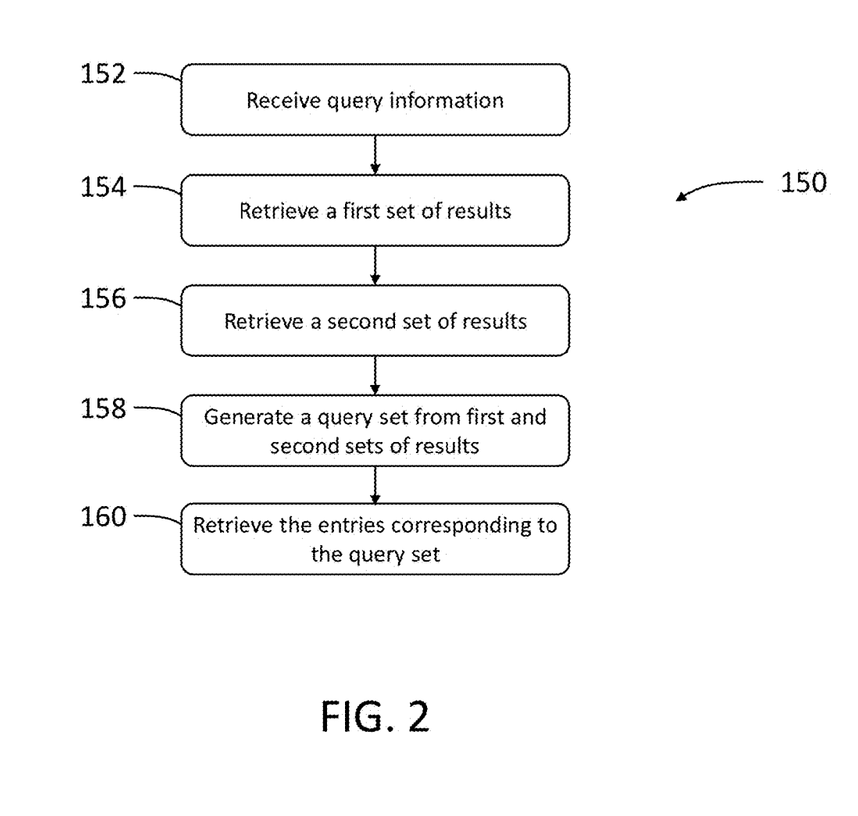
FIG. 2 is a flowchart of a method for querying a deduplicated index data structure, according to an embodiment.
Figure 3:
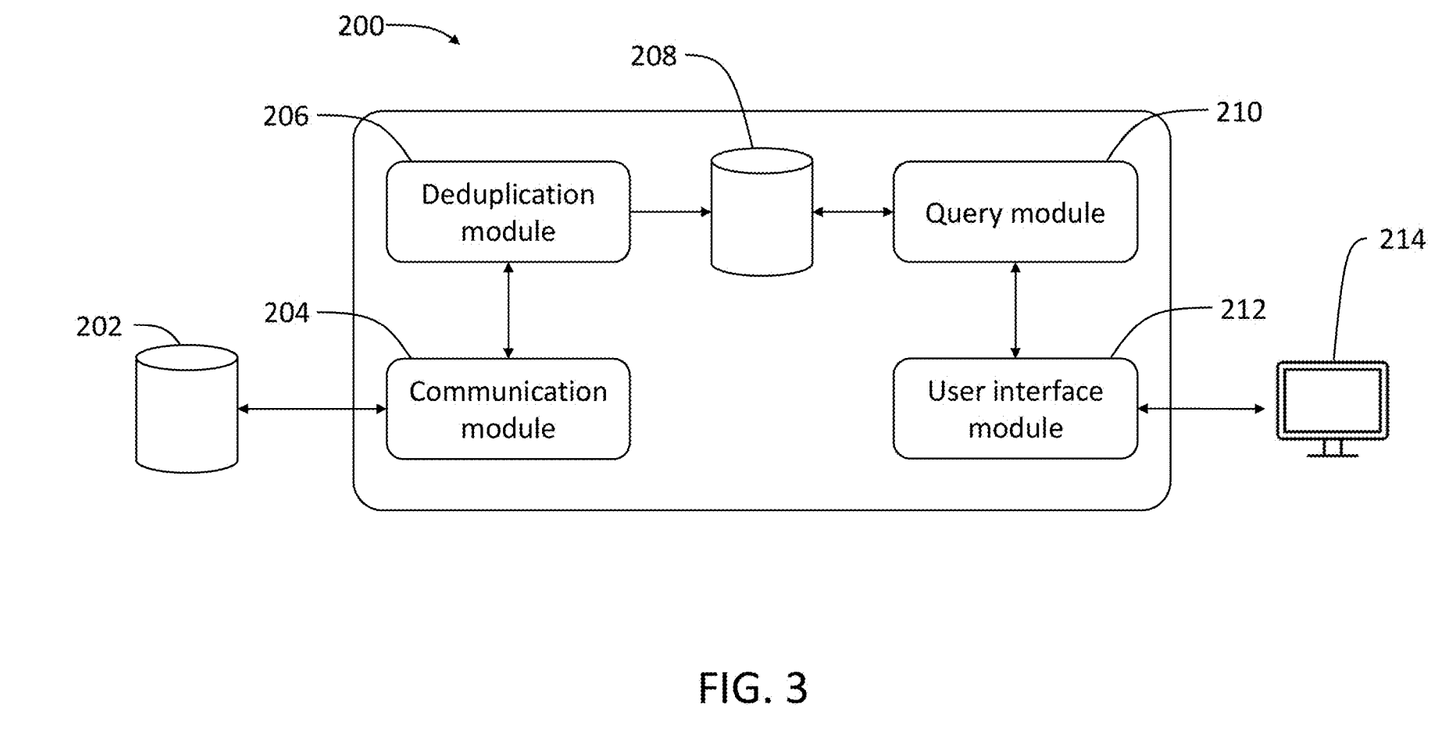
FIG. 3 is a schematic representation of a system for index data structure optimization and query, according to an embodiment.

Referring to FIGS. 1 to 3, methods 100 and 150 and system 200 generally process entries to be deduplicated in order to generate a deduplicated index. Processing the entries includes grouping the entries according to similar field values, and deduplicating a plurality of entries of a group by replacing the entries with a single deduplicated entry. Correspondence vectors are also created so that logical links between the deduplicated entry and the plurality of entries it replaces can be stored. Therefore, the methods and system described herein can be seen as a compression of data entries where the deduplicated entries are the compressed data, and the correspondence vectors are used for decompressing the deduplicated entries.

Turning to FIG. 1, method 100 for optimizing an index data structure using index deduplication includes a first step 102 of retrieving entries to be deduplicated. This step can, for example, include connecting to a database from which the entries are retrieved. In an embodiment, the step of retrieving the entries can include using Application Program Interface (API) to retrieve or receive the entries from a B2B provider. In an embodiment, step 102 can include connecting to one or more external servers or computing devices to gain access to a database or a data structure of the B2B provider and retrieve the entries. In some embodiments, step 102 can include exchanging identification data for authentication purposes prior to connecting with a server or computing device, or a performing handshake method, for example, before the entries to be deduplicated can be retrieved.

In an embodiment, the entries to be deduplicated include at least an identification (ID) field, a first data field and a second data field. The ID field can contain information identifying a client, such as a B2B client, to which the entry is associated, and both first and second data fields contain information associated with a product or service offered by the B2B provider. For example, the entries to be deduplicated can have the format {client ID; product ID; price} or {client ID; product ID; minimal quantity}.

Once the entries to be deduplicated are retrieved, method 100 includes, at step 104, parsing through the entries and identifying groups of entries having a same first data field value. Each group of entries identified therefore includes one or more entries with a same first data field value. In an embodiment, a new group is identified when at least two entries having with a same first data field value are found. However, it should be understood that a different grouping threshold may be used without departing from the present disclosure.

Once the entries have been parsed and one or more groups have been identified, step 106 includes identifying a common second data value in each of the groups previously identified. That is, for each group of entries having a same first data field value, a common second data field value between some entries is identified. In an embodiment, the common second data field value corresponds to the most common second data field value through the group of entries.

At step 108, for each group of entries identified at step 104, a deduplicated entry is created, with a format matching the format of the entries to be deduplicated. Each deduplicated entry stores a first data field value matching the first data field value of a respective group of entries, and a second data field value matching the common second data value identified at step 106 for the group. The deduplicated entry can be referred to as a virtual entry, as it does not directly correspond to one of the entries to be deduplicated. Therefore, a virtual ID is created prior to performing step 108, such that each deduplicated entry stores the virtual ID in its ID field. In other words, for each group identified in step 104, a new duplicated entry is created. The deduplicated entries can be stored in a deduplicated data structure, as will be described in more detail below. Generating the deduplicated entries advantageously prevents having to index every entry having matching first data field values and second data field values.

Because a deduplicated entry effectively replaces a plurality of entries i, or duplicated entries, for a given group, step 110 includes generating correspondence vectors, allowing to "track" the duplicated entries. A correspondence vector is created for each unique client ID found in the entries to be deduplicated. Each vector includes a number of vector fields matching the number of groups created in step 104. For example, if eight groups of entries are identified in step 104, each correspondence vector includes eight vector fields, with each vector field being associated with a respective one of the groups of entries. Step 110 further includes storing, in each vector field of a correspondence vector associated with a client ID, a value indicative of the existence, in the entries to be deduplicated, of a duplicated entry storing the client ID, a first data field value matching the first data field value of the group associated with the vector field, and the common second data field value associated with the group. For example, the value stored in a vector field may be a "1" when such an entry exists, and a "0" otherwise. In other words, the value stored in the vector fields of a correspondence vector associated with a client ID is indicative of the existence, in the entries to be deduplicated, of an entry storing the client ID and having first and second data field values matching the deduplicated entry generated for a group of entries. Therefore, the values of the correspondence vector indicate whether the deduplicated entry for a given replaces an entry to be deduplicated for a given client ID.

At step 112, the deduplicated entries created at step 108, and optionally the correspondence vectors generated at step 110, are stored in a deduplicated data structure, or deduplicated index. Further, remaining entries from the entries to be deduplicated are also added to the deduplicated data structure. The remaining entries are defined as the entries to be deduplicated excluding all the duplicated entries. As mentioned above, the duplicated entries correspond to entries storing a first data field value associated with a group and a second data field value matching the common second data field value of the group. The deduplicated data structure, including the deduplicated entries and the remaining entries, has a reduced size relative to the entries to be deduplicated. The size reduction is a function of the number of duplicated entries found in the entries to be deduplicated. This advantageously allows for reducing the computing needs necessary to generate and maintain the deduplicated index.

In an embodiment, the deduplicated data structure is a B-Tree where the entries are stored in order of second data field values. However, it should be understood that other types of data structures can be used to store the deduplicated entries and the remaining entries without departing from the present disclosure.

Method 100 can include a step 114 of receiving an update request. For example, when the input data, e.g., the entries to be deduplicated, is modified, the deduplicated data structure may have to be regenerated to reflect the changes in the entries. In some embodiments, a B2B provider can send a request for updating the deduplicated data structure, in which case steps 102-112 are repeated.

In some embodiments, method 100 can include repeating steps 106-110 described above to further reduce the number of duplicated entries found in the deduplicated data structure. For example, the steps 106-110 can be repeated to account for the possibility that more than one second data field value can be common within a same group of entries. For example, steps 106-110 can be performed a first time for a primary common second data field value corresponding to the most common second field value found in the entries of a group. In such a case, the virtual ID generated is a primary virtual ID, each deduplicated entry is a primary deduplicated entry, and the correspondence vectors are primary correspondence vectors. On a second iteration of step 106, a secondary most common second data field value can be identified, and subsequently a secondary virtual ID is generated, secondary deduplicated entries are created in step 108, and secondary correspondence vectors are generated in step 110. The number of iterations to be performed can be adjusted based on performance metrics, for example.

Figure 4A:
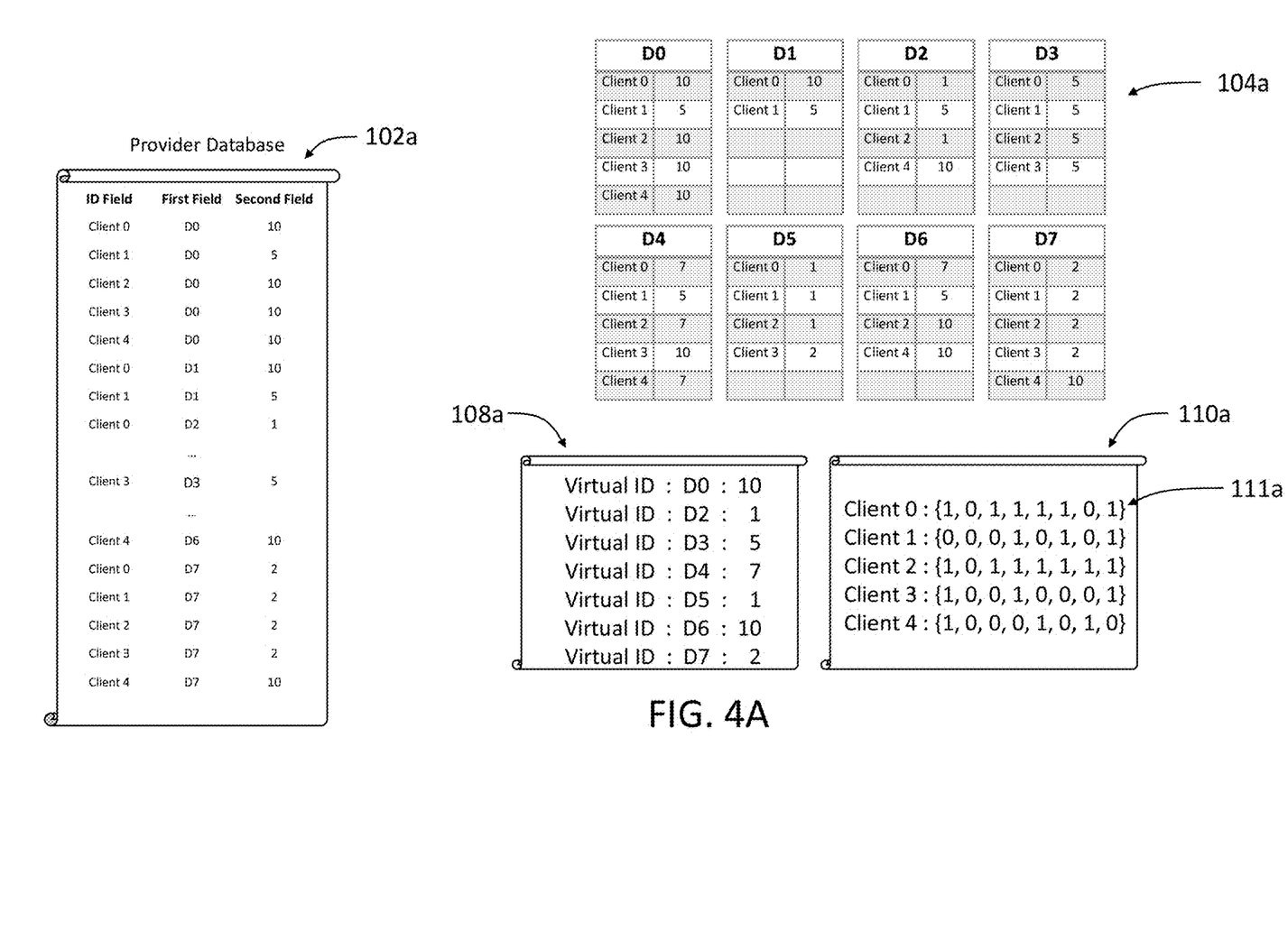
FIG. 4A is a visual representation of an exemplary use of the method of FIG. 1.
Figure 4B:
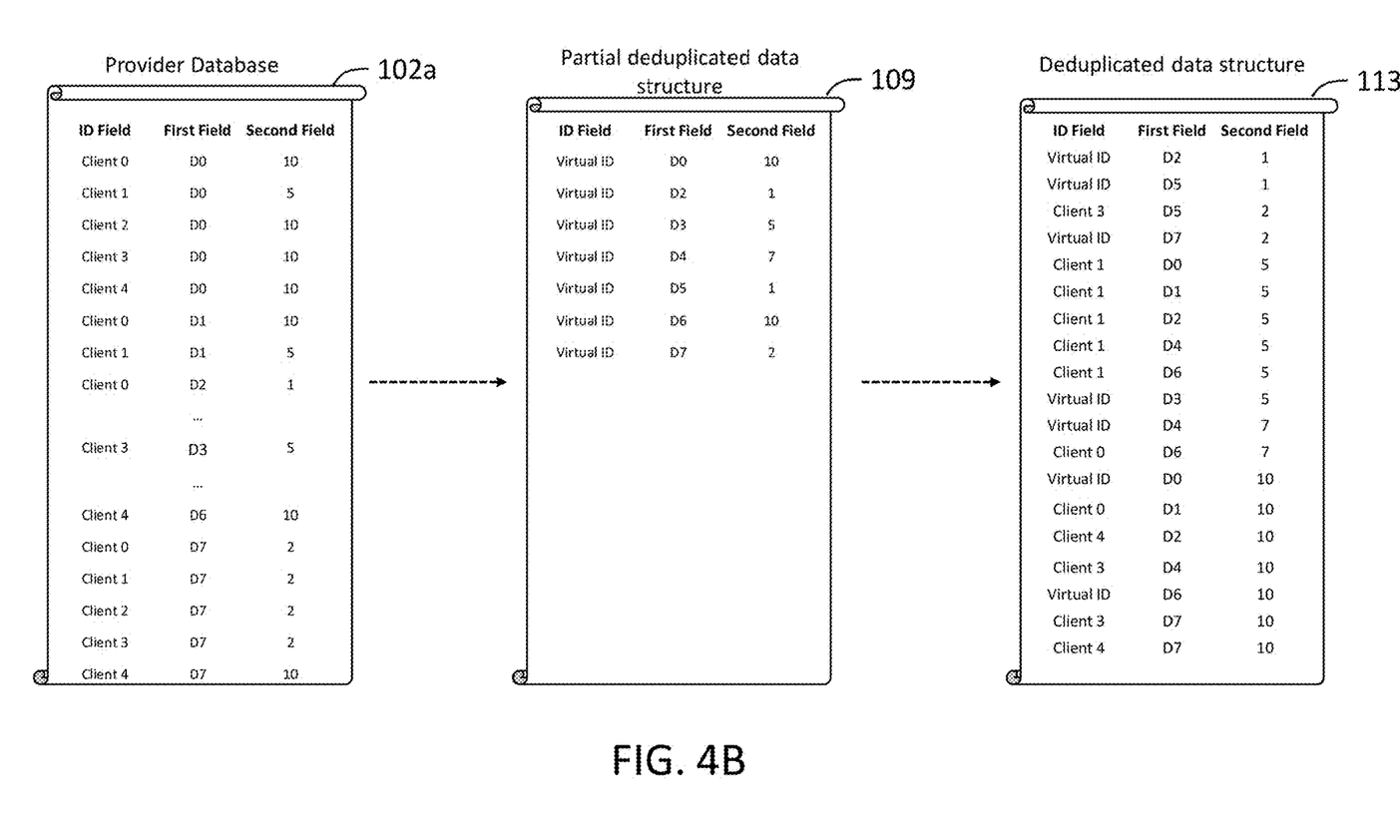
FIG. 4B is a visual representation of a resulting deduplicated data structure based on the example of FIG. 4A.

Turning to the exemplary embodiment of FIGS. 4A-4B, the entries to be deduplicated 102a are retrieved from a database of the B2B provider, each entry having the format {client ID; product ID; price}. From the entries 102a, groups of entries 104a are identified. More specifically, eight groups, based on product IDs D0 to D7, are identified. In this example, only one common second data field value is to be identified. Therefore, a virtual ID "Virtual ID" is created. Subsequently, deduplicated entries 108a are created for each of the product IDs D0 to D7. Further, correspondence vectors 110a are generated for each of Client 0 to Client 4. For each correspondence vector, the first vector field is associated with the product ID D0, the second vector field is associated with the product ID D1, and so on. A value of "1" in the first vector field of the correspondence vector 111a is indicative of the existence, in the entries 102a, of an entry where ID Field value=Client 0, First Field value=D0, and Second Field value=10, as the common second field value for group D0 is 10. Once the deduplicated entries are created, they are stored in the deduplicated data structure 109. The remaining entries are subsequently added to the deduplicated data structure 113. Furthermore, the correspondence vectors can be added to the deduplicated data structure (not shown).

Turning to FIG. 2, the method 150 for querying the deduplicated data structure first includes receiving query information at step 152. For example, the query information can be received via an application interface. The query information, in an embodiment, includes a specific client ID and at least one query value. The query value can be a first data field value and/or a second data field value.

When the query information contains a client ID and a second data field value, the method includes, at step 154, retrieving a first set of results using the deduplicated data structure. The first set of results is retrieved based on the deduplicated entries created at step 108 of method 100 (FIG. 1). Retrieving the first set of results includes generating a virtual ID vector having a plurality of vector fields, each vector field being associated with one group of entries identified in step 104 of method 100. Step 154 further includes storing, in each vector field of the virtual ID vector, a value indicative of the existence of a deduplicated entry with a first data field value matching the group associated with the vector field, and a second data field value matching the query value of the query information. For example, the value can be a "1" when such an entry exists, and a "0" otherwise.

Once the virtual ID vector is generated, step 154 further includes comparing the virtual ID vector with the correspondence vector associated with the client ID of the query information. This comparison includes performing a field-by-field comparison, or bitwise AND operation, between the virtual ID vector and the correspondence vector, thereby validating, for each group of entries, whether a deduplicated entry matching the query information exists for the client ID matching the query information. The resulting first result vector is the first set of results.

As described above, some embodiments include creating more than one deduplicated entry for each of group of entries, such as a primary deduplicated entry and a secondary deduplicated entry, to account for more than one second data field value being duplicated in the group. Therefore, the virtual ID vector generated in step 154 described above is a primary virtual ID vector storing, in each vector field, a value indicative of the existence of a primary deduplicated entry with a first data field value matching the group associated with the vector field, and a second data field value matching the query value of the query information. Further, a secondary virtual ID vector is generated storing in each of its vector fields, a value indicative of the existence of a secondary deduplicated entry with a first data field value matching the group associated with the vector field, and a second data field value matching the query value of the query information. Furthermore, the primary virtual ID vector is compared with a primary correspondence vector associated with the client ID of the query information, and the secondary virtual ID vector is compared with a secondary correspondence vector associated with the client ID. In such embodiments, the first result vector is a combination of the primary comparison and the secondary comparison.

Still referring to FIG. 2, step 156 includes retrieving, from the deduplicated data structure, a second set of results. The second set of results is retrieved from the remaining entries added to the deduplicated data structure at step 112 of method 100. Step 112 includes generating a client ID vector with a plurality of vector fields, similar to the virtual ID vector. That is, the number of vector fields of the client ID vector corresponds to the number of groups identified by method 100, and each vector field is associated with one of the groups. Step 122 further includes storing, in each vector field of the client ID vector, a value indicative of the existence, in the remaining entries, of an entry having an ID field value matching the client ID of the query information, a first data field value matching the group associated with the vector field, and a second data field value matching the query value. For example, the value may be a "1" when such an entry exists, and a "0" otherwise.

Once the first and second sets of results are received, the method 150 includes, at step 158, combining both sets of results to obtain a query result. Combining both sets of results includes performing a field-by-field combination, or bitwise OR operation, between the first set of results and the second set of results. The query result is therefore indicative of the existence, in the entries to be deduplicated, of entries having an ID field value matching the client ID of the query information, and a second data field value matching the query value. The query result can be returned through the application interface. Alternatively, at step 160, the query result can be used to fetch actual information associated with the identified entries from the deduplicated data structure and returning the information associated with the identified entries instead. For example, the method can retrieve the information associated with the query result from another data structure storing the entries provided by the B2B provider, or from the database of the B2B provider. In some embodiments, the data can be formatted into human-readable information.

It should be understood that the steps of method 150 can be adapted to process a query where the query information includes a first data field value instead of a second data field value. The steps of method 150 can be performed similar to the above description, with the virtual ID vector storing values indicative of the existence of deduplicated entries having a first data field value matching the query value. Further, it should be noted that the query value can be a single value, or a range of values.

Figure 5:
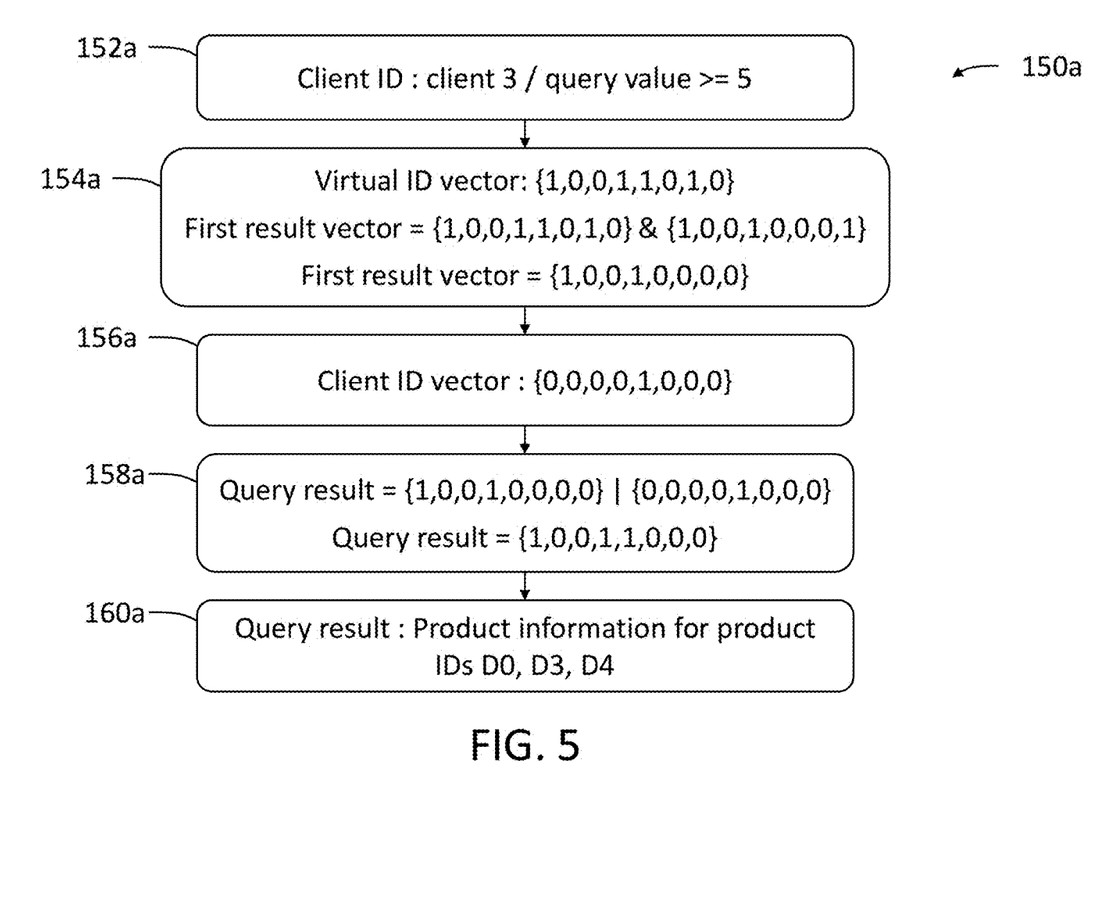
FIG. 5 is a visual representation of an exemplary query performed based on the example of FIGS. 4A-4B, using the method of FIG. 2.

Turning to the example 150a of FIG. 5, which builds on the example of FIGS. 4A-5B, the query information received at step 152*a* includes a client ID "Client 3" and a query value "second data field value >=5". In this example, the first data field is associated with a product ID, and the second data field value is associated with a price. As eight groups of entries, or product IDs, have been identified at step 104*a* (FIG. 4A), the virtual ID vector contains eight vector fields at step 154*a*. Each vector field stores a value indicative of the existence of a deduplicated entry for a product ID associated with the vector field, having a price value being equal to or greater than 5.

Therefore, at step 154*a*, the deduplicated entries are queried and the virtual ID vector is generated with the values {1, 0, 0, 1, 1, 0, 1, 0}, which indicates that the deduplicated entries for product IDs D0, D3, D4 and D6 have a second data field value, or a price, equal to or greater than 5. Once the virtual ID vector is created, it is compared with the correspondence vector associated with the Client ID of the query information. In the example of FIG. 5, the Client ID is "client 3", for which the correspondence vector={1, 0, 0, 1, 0, 0, 0, 1}, indicating an association between Client 3 and the deduplicated entries created for product IDs D0, D3 and D7. The vector resulting from the comparison is a first result vector={1, 0, 0, 1, 0, 0, 0, 0}, indicative of the existence of two entries matching the Client ID "Client 3" and having a price equal to or greater than 5, the two entries being associated with product IDs D0 and D2.

At step 156*a*, the remaining entries are queried, and the client ID vector for Client ID "Client 3" is generated with the values {0, 0, 0, 0, 1, 0, 0, 0,}, indicating that only one entry was found in the remaining entries having the ID field value matching "Client 3" and a price equal to or greater than 5, this entry corresponding to product ID D4.

The first result vector and the client ID vector are combined at step 158*a* resulting in a query result={1, 0, 0, 1, 1, 0, 0, 0}. This query result is indicative that there exist three entries matching the query information, i.e., three entries have a field ID matching "client 3" and a price equal to or greater than 5, and that those entries are associated with product IDs D0, D3 and D4. In other words, the following entries would be found in the entries to be deduplicated: {client 3, D0, 10}, {client 3, D3, 5} and {client, D4, 10}. However, as can be seen in the deduplicated data structure 113 in FIG. 4B, only the entry {client 3; D4; 10} has been stored. Indeed, the other two entries are not stored in the deduplicated data structure as they are duplicated entries. The query result can be used, at step 160*a*, to fetch product information associated with each product ID D0, D3 and D4.

The method therefore allows for presenting each product resulting from the query information with an exact price offer for client 3, at query time, such as when searching through a website, rather than at checkout.

Turning to FIG. 3, a system 200 for index data structure optimization implements both methods 100 and 150. The system 200 includes a communication module 204 adapted to communicate with a provider computing device 202. In an embodiment, the provider computing device 202 includes a database or data storage of a B2B provider. For example, the communication module can include an Application Program Interface (API) allowing for interacting with the provider computing device 202. The API can be adapted for automatically transferring entries to be deduplicated from the provider computing device 202 to the system 200. Additionally, or alternatively, the API can allow a B2B provider to send control signals to the system 200, so as to trigger a new indexing of the entries to be deduplicated, for example when the database of the B2B provider has been updated.

The system 200 further includes a deduplication module 206 adapted to perform the steps 104 to 112 of method 100. Therefore, the deduplication module 206 can include one or more processing devices and a non-transitory memory storing computer-readable instructions thereon which, when executed by the one or more processing devices, performs steps 104 to 112. The deduplication module 206 is operatively connected with the communication module 204 for receiving the entries to be deduplicated. The deduplication module 206 can include configurable parameters for customizing the generation of the deduplicated data structure. For example, a parameter for determining the number of common second data field values to be identified in each group may allow for choosing a compression factor. Indeed, if this parameter is set to one, only the entries with the most common second data field value for a given group can be deduplicated. If this parameter is set to two, for example, a primary deduplicated entry will be generated for the most common second data field value, and a secondary deduplicated entry will be generated for a second most common second data field value, thereby reducing the overall number of entries in the deduplicated data structure. Other parameters can be contemplated without departing from the present disclosure.

The system 200 further includes a storage module 208 adapted to store the deduplicated data structure, or deduplicated index. Various storage schemes can be contemplated for creating the deduplicated data structure. In an embodiment, the storage module includes a B-tree data structure that is used for storing the deduplicated index. However, in alternative embodiments, the storage module 208 can include a database, or other data structure models. The storage module 208 is also adapted to store the correspondence vectors, and optionally the virtual ID vector, the client ID vector and the query result associated with a query. Both the deduplication module 206 and the query module 210 described below are operatively connected with the storage module 208 to interact with the deduplicated data structure.

The system 200 further includes a query module 210 adapted to perform the steps of method 150. The query module 210 can be provided on the same computing hardware as the other modules, for example when the system 200 comprises a single computing device or server, or it can be provided on separate computing hardware as the other modules. For example, in a distributed computing network implementing the system 200, each separate server or computing device node can include a single module of the system 200. Therefore, in some embodiments, the query module 210 can include one or more processing devices and a non-transitory memory storing computer-readable instructions thereon which, when executed by the one or more processing devices, performs steps 152 to 160. The query module 210 is operatively connected with a User Interface (UI) module 212, described below, and to the storage module 208.

The UI module 212 is adapted to communicate, using an application interface, with a client computing device 214. For example, the client computing device 214 can be a personal computer (PC), a portable computer, or a smartphone. The UI module 212 is adapted to allow communication between the system and the client computing device 214. For example, queries are received by the UI module 212 and transmitted to the query module 210, and the query results are sent to the client computing device 214 using the UI module 212. In an embodiment, the UI module 212 includes a graphical user interface (GUI) for interacting with a client, such as a B2B client.

The system 200, in some embodiments, comprises a single server with at least one processing device and non-transitory memory adapted to control and/or implement the modules 204, 206, 208, 210 and 212. In alternate embodiments, the system 200 can be distributed, for example comprising a plurality of computers communicating over a network, such as a cloud network. Other hardware configuration can be contemplated without departing from the present disclosure.

As mentioned above, the methods and system disclosed herein allow for improving the performance of one or more computing devices tasked with indexing and querying data entries. Notably, generating a deduplicated data structure allows for reducing computing power required for indexing the data entries and for reducing the data storage needed to the data structure, as a reduced number of entries are indexed. Further, upon querying the deduplicated data structure, the necessary computing power and/or computational time required to extract information is reduced compared to querying through all the original entries.

Figure 6:
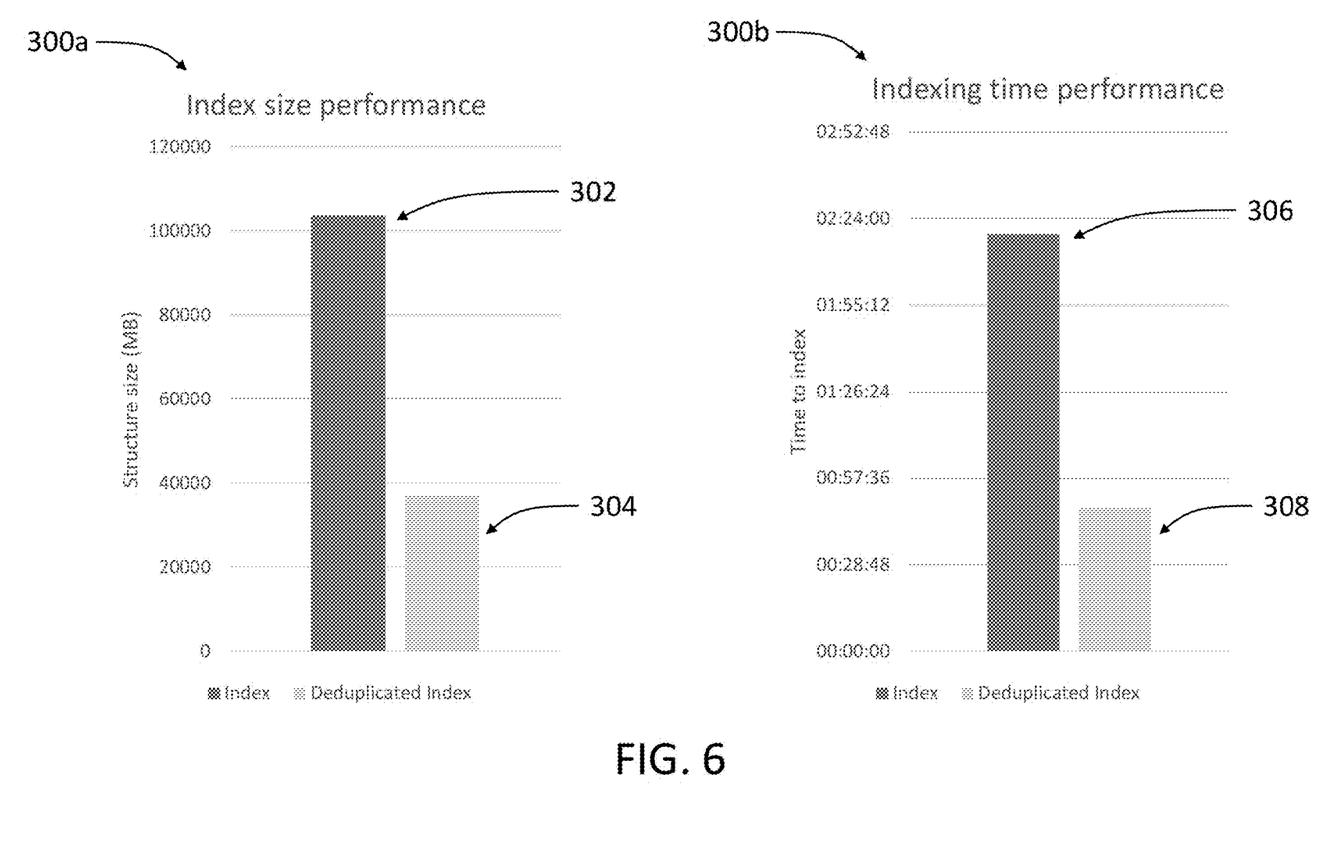
FIG. 6 is a visual representation of a potential performance improvement of the method of FIG. 1.

Referring to FIG. 6, index size metrics 300a and indexing time metrics 300b are compared between an indexing of data entries without using the method described herein and an indexing using the method described herein. In this example approximately 50,000 documents each having up to 100,000 different price points are to be indexed, resulting in up to 5 billion initial data entries to be indexed. Both indexing methods use a B-Tree to store the index. In graph 300a, the non-deduplicated index size, or data structure size, is over 103,000 MB (302), while the deduplicated data structure size, once the entries have been deduplicated, is below 37,000 MB (304). In graph 300b, the indexing time for the non-deduplicated index is 2:18:45 (306), while the indexing time for the deduplicated data structure is 0:47:50 (208). Therefore, indexing data entries according to the method described in the present disclosure advantageously allows for reducing the indexing time and the storage needs.

The methods and system described hereinabove allow for processing a large number of entries and generating a deduplicated index, or data structure. The methods generally include finding duplicated entries through the entries to be deduplicated and creating a new "virtual" entry replacing those duplicated entries. As each entry to be deduplicated includes an identification, which is not necessarily duplicated data, correspondence vectors are generated so that the new "virtual" entry can be re-associated with the replaced entries. The methods and system described herein further allow for querying a large dataset and being capable, using the deduplicated index, of returning specific data entries faster than would be possible using a known index. In B2B environment, this allows, for example, to fetch product information including a specific price for a B2B client at query time. However, the methods and system are not limited to the B2B environment, and may be used in any field using large datasets that need to be indexed and queried, where the data entries may have a level of deduplication.

This inventive subject matter has been described in terms of specific embodiments, embodiments and configurations which are intended to be exemplary only. Persons of ordinary skill in the art will appreciate, having read this disclosure, that many obvious variations, modifications and refinements may be made without departing from the inventive concept(s) presented herein. The scope of the exclusive right sought by the Applicant(s) is therefore intended to be limited solely by the appended claims.

The invention claimed is:

1. A method for deduplication of document entries in a database, the method comprising steps of:
   retrieving, from the database, entries to be deduplicated, each entry comprising an identification (ID) field, a first data field and a second data field;
   parsing the entries and identifying groups of entries therein, each group comprising one or more entries having a same first data field value;
   generating a virtual ID value for identifying new entries;
   for each group of entries:
      identifying a common second data field value; and
      creating a deduplicated entry in a deduplicated database with the virtual ID value in the ID field, the first data field value of the group of entries in the first data field and the common second data field value in the second data field, respectively;
   for each unique ID field value of the entries to be deduplicated:
      generating a correspondence vector having a plurality of vector fields, each vector field associated with one of the group of entries; and
      storing, in each vector field, a value indicative of an existence, in the entries to be deduplicated, of a duplicated entry containing the unique ID field value, the first data field value of the group of entries associated with the vector field, and the common second data field of the group of entries; and
   adding, to the deduplicated database, remaining entries comprising the entries to be deduplicated excluding duplicated entries, the deduplicated database comprising the deduplicated entries and the remaining entries and having a reduced size relative to a size of the entries to be deduplicated, thereby reducing computing needs for storing the deduplicated database.

2. The method of claim 1, further comprising steps of querying the deduplicated database including:
   receiving query information from an application interface, the query information including a specific client ID field value and at least one of a first data field query value and a second data field query value;
   retrieving, from the deduplicated database, first and second sets of results using the query information, the first set of results being retrieved from the deduplicated entries and the second set of results being retrieved from the remaining entries;
   combining the first and second sets of results to generate a combined query set indicative of an existence of one or more result entries containing the specific client ID field value and the at least one of the first data field query value and the second data field query value;
   retrieving, in the deduplicated database, the one or more result entries based on the combined query set, and
   transmitting, to the application interface, the one or more result entries corresponding to the query information.

3. The method of claim 2, wherein when the query information includes the specific client ID field value and the second data field query value, the step of retrieving the first set of results includes:
   generating a virtual ID vector having a plurality of virtual ID vector fields, each virtual ID vector field associated with one of the groups of entries;
   storing, in each vector field of the virtual ID vector, a value indicative an existence of an entry containing the virtual ID value, the first data field value of the group of entries associated with the virtual ID vector field, and a second data field value matching the second data field query value; and
   comparing, using a field-by-field comparison, the virtual ID vector with the correspondence vector associated with the specific client ID field value of the query to generate the first set of results.

4. The method of claim 3, wherein the step of retrieving the second set of results includes:
   generating a client ID vector having a plurality of client ID vector fields, each client ID vector field associated with one of the groups of entries; and
   storing, in each client ID vector field, a value indicative of an existence of an entry storing the specific client ID field value, the first data field value of the group of entries associated with the client ID vector field, and the second data field query value, the second set of results comprising the client ID vector.

5. The method of claim 2, wherein combining the first and second sets of results comprises performing a field-by-field combination of the first and second sets of results.

6. The method of claim 2, further comprising a step of converting the result entries into human-readable results.

7. The method of claim 2, wherein the at least one of a first data field query value and a second data field query value comprises a range of values.

8. The method of claim 2, wherein the virtual ID value is a primary virtual ID value, the common second data field value is a primary common second data field value, and each correspondence vector is a primary correspondence vector; and wherein the method comprises steps of:
   determining a secondary virtual ID value for identifying additional new entries;
   for each group of entries:
      identifying a secondary common second data field value; and
      creating a deduplicated entry with the second virtual ID value in the ID field, the first data field value in the first data field and the secondary common second data field value in the second data field, respectively;
   for each unique ID field value of the entries to be deduplicated:
      generating a secondary correspondence vector having a plurality of vector fields, each vector field associated with one of the group of entries; and
      storing, in each vector field, a value indicative of an existence, in the entries to be deduplicated, of an additional duplicated entry containing the unique ID field value, the first data field value of the group of entries associated with the vector field, and the secondary common second data field of the group of entries,
   wherein the remaining entries comprise the entries to be deduplicated excluding the duplicated entries and additional duplicated entries.

9. The method of claim 8, the steps being repeated for a plurality of additional common second data field values.

10. The method of claim 8, wherein when the query information includes the specific client ID field value and the second data field query value, the step of retrieving the first set of results includes:
   generating primary and secondary virtual ID vectors, each virtual ID vector having a plurality of virtual ID vector fields, each virtual ID vector field associated with one of the groups of entries;
   storing, in each virtual ID vector field of the primary virtual ID vector, a value indicative an existence of an entry containing the primary virtual ID value, the first data field value of the group of entries associated with the virtual ID vector field, and a second data field value matching the second data field query value;

storing, in each virtual ID vector field of the secondary virtual ID vector, a value indicative an existence of an entry containing the secondary virtual ID value, the first data field value of the group of entries associated with the virtual ID vector field, and the second data field value matching the second data field query value;

comparing, using a field-by-field comparison, the primary virtual ID vector with the primary correspondence vector associated with the specific client ID field value of the query to generate a primary first result vector;

comparing, using the field-by-field comparison, the secondary virtual ID vector with the secondary correspondence vector associated with the specific client ID to generate a secondary first result vector; and combining, using a field-by-field combination, the primary and secondary first result vectors to generate the first set of results.

11. The method of claim 1, wherein the deduplicated database is stored in a B-tree, wherein the entries are arranged in an order of second data field values.

12. A system for data deduplication comprising:

a communication module adapted to communicate with a provider database to retrieve entries to be deduplicated, each entry comprising an identification (ID) field, a first data field and a second data field, the provider database being external to the system;

a deduplication module adapted to deduplicate the entries retrieved by the communication module by:

parsing the entries to be deduplicated and identifying therein groups of entries, each group comprising one or more entries having a same first data field value;

generating a virtual ID value for identifying new entries;

for each group of entries:
identifying a common second data field value; and
creating a deduplicated entry with the virtual ID value in the ID field, the first data field value of the group of entries in the first data field and the common second data field value in the second data field, respectively;

for each unique ID field value of the entries to be deduplicated:
generating a correspondence vector having a plurality of vector fields, each vector field associated with one of the group of entries; and
storing, in each vector field, a value indicative of an existence, in the entries to be deduplicated, of a duplicated entry containing the unique ID field value, the first data field value of the group of entries associated with the vector field, and the common second data field of the group of entries;

a deduplicated database configured for storing deduplicated entries received from the deduplication module and remaining entries, the remaining entries comprising the entries to be deduplicated excluding duplicated entries; and at least one processing device and one non-transitory memory having processor-readable instructions stored thereon that, when read by the processing device, are configured to control the communication module and the deduplication module.

13. The system of claim 12, further comprising:

a client interface module adapted to receive query information from a client device and to transmit query results to the client device; and a query module adapted to retrieve query results in the deduplicated database based on the query information, wherein the instructions are further configured to control the client interface module and the query module.

14. A non-transitory computer-readable medium storing computer-readable instructions thereon that, when read by a computer, perform a method for deduplication of document entries in a database, the method comprising steps of:

retrieving, from the database, entries to be deduplicated, each entry comprising an identification (ID) field, a first data field and a second data field;

parsing the entries and identifying groups of entries therein, each group comprising one or more entries having a same first data field value;

generating a virtual ID value for identifying new entries;

for each group of entries:
identifying a common second data field value; and
creating a deduplicated entry in a deduplicated database with the virtual ID value in the ID field, the first data field value of the group of entries in the first data field and the common second data field value in the second data field, respectively;

for each unique ID field value of the entries to be deduplicated:
generating a correspondence vector having a plurality of vector fields, each vector field associated with one of the group of entries; and
storing, in each vector field, a value indicative of an existence, in the entries to be deduplicated, of a duplicated entry containing the unique ID field value, the first data field value of the group of entries associated with the vector field, and the common second data field of the group of entries; and adding, to the deduplicated database, remaining entries comprising the entries to be deduplicated excluding duplicated entries, the deduplicated database comprising the deduplicated entries and the remaining entries and having a reduced size relative to a size of the entries to be deduplicated, thereby reducing computing needs for storing the deduplicated database.

15. The non-transitory computer-readable medium of claim 14, the method for deduplication of document entries in a database further comprising steps of querying the deduplicated database including:

receiving query information from an application interface, the query information including a specific client ID field value and at least one of a first data field query value and a second data field query value;

retrieving, from the deduplicated database, first and second sets of results using the query information, the first set of results being retrieved from the deduplicated entries and the second set of results being retrieved from the remaining entries;

combining the first and second sets of results to generate a combined query set indicative of an existence of one or more result entries containing the specific client ID field value and the at least one of the first data field query value and the second data field query value;

retrieving, in the deduplicated database, the one or more result entries based on the combined query set, and transmitting, to the application interface, the one or more result entries corresponding to the query information.

16. The non-transitory computer-readable medium of claim 15, wherein when the query information includes the specific client ID field value and the second data field query value, the step of retrieving the first set of results includes:

generating a virtual ID vector having a plurality of virtual ID vector fields, each virtual ID vector field associated with one of the groups of entries;

storing, in each vector field of the virtual ID vector, a value indicative an existence of an entry containing the virtual ID value, the first data field value of the group of entries associated with the virtual ID vector field, and a second data field value matching the second data field query value; and comparing, using a field-by-field comparison, the virtual ID vector with the correspondence vector associated with the specific client ID field value of the query to generate the first set of results.

17. The non-transitory computer-readable medium of claim 16, wherein the step of retrieving the second set of results includes:

generating a client ID vector having a plurality of client ID vector fields, each client ID vector field associated with one of the groups of entries; and storing, in each client ID vector field, a value indicative of an existence of an entry storing the specific client ID field value, the first data field value of the group of entries associated with the client ID vector field, and the second data field query value, the second set of results comprising the client ID vector.

18. The non-transitory computer-readable medium of claim 15, wherein combining the first and second sets of results comprises performing a field-by-field combination of the first and second sets of results.

19. The non-transitory computer-readable medium of claim 15, the method for deduplication of document entries in a database further comprising a step of converting the result entries into human-readable results.

20. The non-transitory computer-readable medium of claim 15, wherein the at least one of a first data field query value and a second data field query value comprises a range of values.

* * * * *